Figure 1:
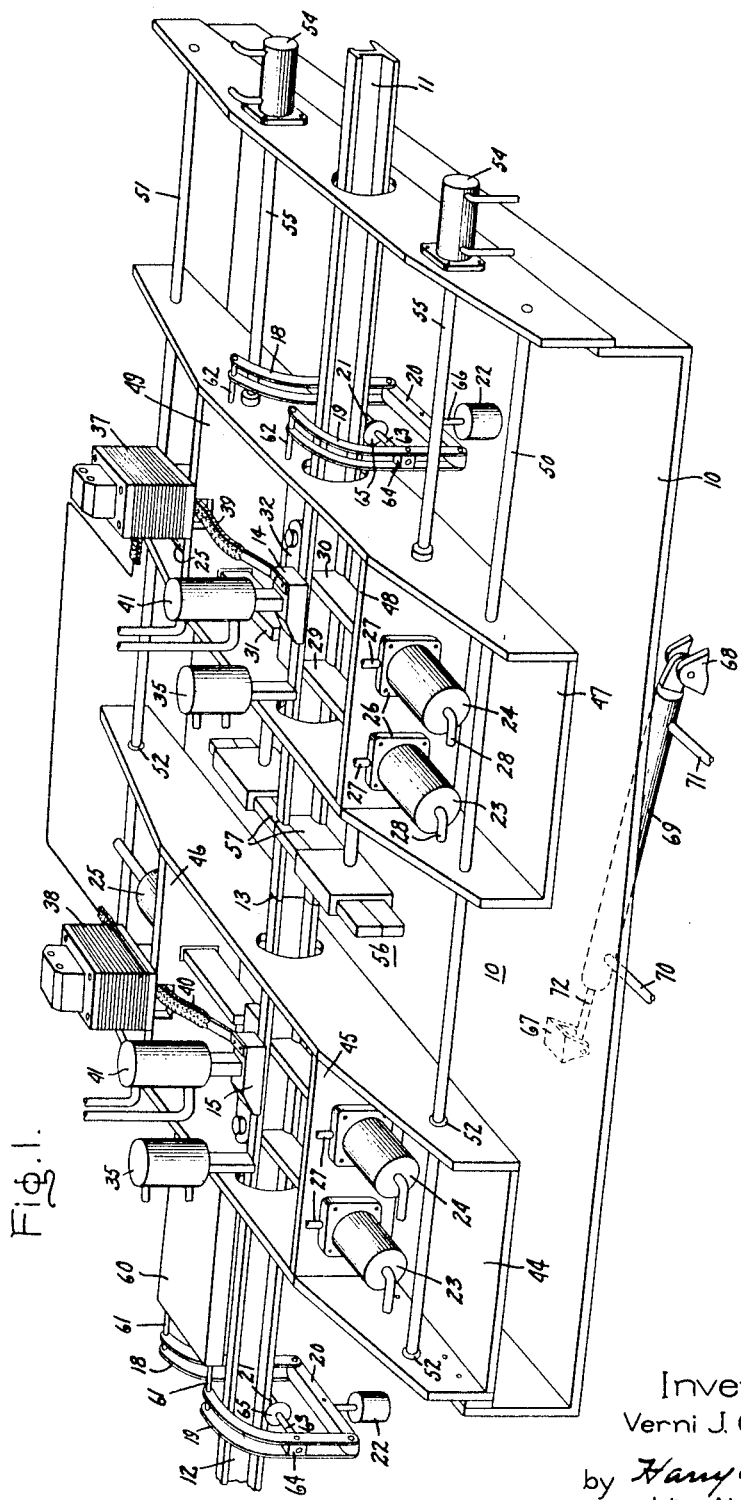

Nov. 17, 1942.   V. J. CHAPMAN   2,302,420
WELDING MACHINE
Filed Dec. 13, 1941   2 Sheets-Sheet 1

Inventor:
Verni J. Chapman,
by Harry E. Dunham
His Attorney.

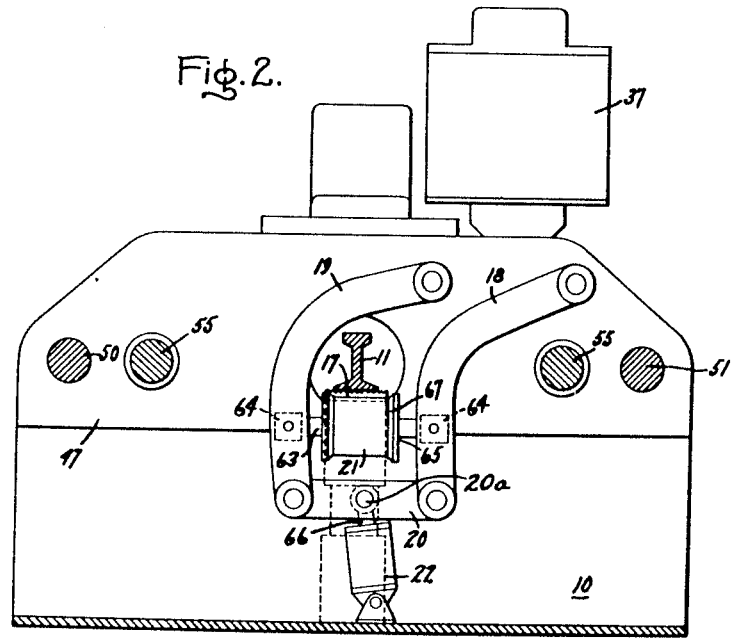
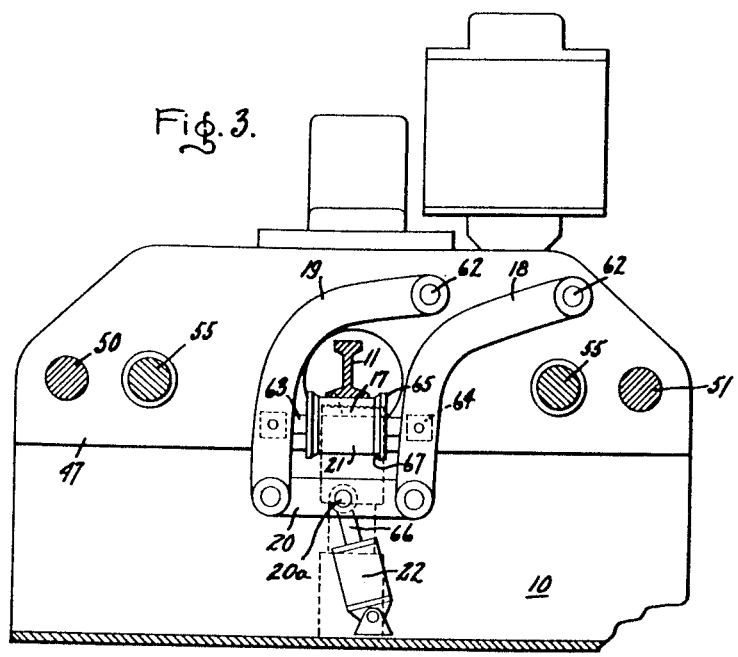

Patented Nov. 17, 1942

2,302,420

UNITED STATES PATENT OFFICE 2,302,420

WELDING MACHINE

Verni J. Chapman, Schenectady, N. Y., assignor to General Electric Company, a corporation of New York Application December 13, 1941, Serial No. 422,896

3 Claims. (Cl. 219—4)

My invention relates to butt welding apparatus, and more particularly to resistance butt welding apparatus.

Apparatus has been provided in the past for welding rails and the like end to end in order to provide a continuous article of any desired length. It is an object of my invention to provide such apparatus with means facilitating the movement of such articles through the welding apparatus.

Further objects and advantages of my invention will become apparent as the following description proceeds and the features of novelty which characterize my invention will be pointed out with particularity in the claims annexed to and forming a part of this specification.

For a better understanding of my invention reference may be had to the accompanying drawings in which Fig. 1 is a perspective view, generally diagrammatic in form, illustrating the features of my invention; Fig. 2 is an end view of the apparatus shown in Fig. 1 illustrating the features of my invention when the apparatus is in the welding position; and Fig. 3 is a view similar to Fig. 2 illustrating the position of the apparatus when utilized for moving the articles being welded through the apparatus.

I have illustrated a welding apparatus or machine for butt welding articles such as the rails 11 and 12 at the adjacent ends thereof, as indicated by the numeral 13. In order to conduct welding current to the welding point there are provided electric terminals 14 and 15, the rails 11 and 12 being supported at the terminals by terminal blocks 17 (see Figs. 2 and 3). When the rails to be welded are being moved into the welding position or being withdrawn therefrom preparatory to welding the next joint, considerable wear and friction will be developed at the support surfaces of the terminal blocks unless means is provided for lifting the articles to be welded from the supports, thereby reducing the scraping and frictional action thereon.

In the form of my invention illustrated in the drawings, this means takes the form of a pair of curved levers 18 and 19, respectively, pivoted at their upper ends to the welding machine. The lower ends of the levers are joined by a link 20, a roller 21 being journaled between the levers 18 and 19 and serving to guide the rails. In order to elevate or to lower the rails I have provided fluid operated means as indicated by the numeral 22 for causing movement of the lever assembly about the pivot points which causes the roller to be moved upwardly or downwardly according to the election of the operator. When it is desired to move the rails, the apparatus will be operated to elevate the rollers into engagement with the bottom flange of the rails thereby lifting the rails off the terminal blocks and permitting the rails to be moved longitudinally through the welder on the rollers without scraping the anvils or terminal blocks.

The welding apparatus is carried by a frame 10. In order to support the article to be welded, as the rails 11 and 12, in suitable welding position, there is provided on the frame suitable clamping means. I have illustrated, on one side of the rail 11 a pair of fluid operated devices 23 and 24, and on the other side of the rail 11 a fluid-operated device 25. Inasmuch as the details of these devices form no part of my present invention, it is believed unnecessary to fully illustrate their details. It is believed sufficient at this point to state that suitable apparatus may include hydraulic cylinders containing fluid operated pistons suitably secured as by means of bases 26 to partitions 48 of the frame. Suitable means for conducting an operating fluid to and from the cylinders is provided, such as conduits 27 and 28, respectively. The fluid-operated device 25 acts upon the rail through an operating member 31 and a pivotally arranged operating member 32 having direct engagement with the web of the rail. It will be seen that the members 29 and 30, actuated according to the pressure in the devices 23 and 24 will securely maintain the rail against the member 32. The rail 12 will be securely clamped in position in a similar manner and by similar apparatus. In order to align the articles to be welded and maintain them in the aligned position during the welding operation I also provide a vertical clamping means. This means includes the afore-mentioned anvils or terminal blocks 17, the rails being pressed securely against the anvils or supports in the welding position by means of fluid-operated devices 35, these devices being similar in character to the devices 23 and 24.

I have provided means, as suggested hitherto, for conducting welding current across the joint 13 to be welded. This means comprises a pair of welding transformers 37 and 38, the secondaries thereof being connected in a series circuit with the rails 11 and 12, the primaries not being shown. The connections from the transformers 37 and 38 to the rails 11 and 12 are completed through conductor 39 and terminal block 14 and conductor 40 and terminal block 15, respectively.

In order to maintain good electrical connections between the terminal blocks and the rails I have provided suitable means for pressing the terminal blocks against the rails. In the form of my invention shown in the drawings these means take the form of fluid-operated devices 41.

The anvils or blocks 17 may be made adjustable if desired in order to provide alignment means for accurately aligning the rails with respect to each other.

I have provided means for maintaining one of the rails or articles to be welded in fixed position and means for moving the other of said rails into sparking engagement with the first-mentioned rail. To this end I have provided in fixed relation with the frame 10 a sub-assembly or support 44 comprising in the illustration a generally U-shaped structure having a pair of laterally extending partitions or supports 45 and 46 which serve to support the fluid-operated devices and the transformer 38. In order to provide a movable support for the rail 11, I have provided a sub-assembly as represented by the numeral 47 similar in form and construction to the sub-assembly 44, laterally extending partitions 48 and 49 being provided for the same purpose as the corresponding partitions 45 and 46. The sub-assembly 47 is movably supported with respect to the sub-assembly 44 by means of a pair of guide members 50 and 51 extending through suitable openings in the sub-assembly 47 and also through suitable openings in the walls of the sub-assembly 44. If the guides or supports 50 and 51 are of electrically conducting material, they must be suitably insulated as indicated by the numerals 52 from the associated walls of the sub-assembly 44. In order to cause movement of the rail 11 toward and away from the joint to be welded I have provided a pair of fluid-operated devices 54 operatively associated with members 55 attached at the opposite end from the fluid-operated devices to the movable sub-assembly 47.

As will be understood by those skilled in the art, apparatus of the above-described type is operated substantially as follows. The rail 12 will be moved through the apparatus leaving the end to be welded at the welding position. The next rail 11 is then moved into the apparatus and deposited approximately in the welding position. Each rail is then securely clamped by the associated clamping apparatus and the electrical terminals moved into position. The fluid-operated devices 54 are then operated to cause the push-up mechanism associated therewith to move the sub-assembly 47 and therefore the rail 11 to sparking engagement with the rail 12. The rails are left in this position a sufficient time adequately to heat the metal at the joint, the proper length of time being determined by experiment. As soon as the proper temperature has been reached, the push-up mechanism is again operated to apply additional pressure to the joint and upset a portion of the metal at the joint, forming a bead. Following this operation the welding power is cut off.

I have illustrated means to cut the flash or bead, the means including a flash trimmer represented by the numeral 56. The faces of the rail may be suitably trimmed by suitable cutting tools 57. A flash trimmer of the type illustrated herein is described and claimed in my copending application, Serial No. 346,157, filed July 18, 1940, since matured into Patent No. 2,272,737, dated February 10, 1942, and assigned to the same assignee as my present invention.

In order to operate the flash remover, preferably carried by the front end of the movable sub-assembly 47, the cutting blades are moved into rail-engaging position and the push-up mechanism operated to advance the cutting edges of the tools into engagement with the bead at the welded joint. After the bead is removed the flash cutter is removed or withdrawn from rail-engaging position and the completed continuous rail, including rail portions 11 and 12, moved to the left as viewed in Fig. 1, until the free end of rail 11 is in the welding position.

I have provided means for lifting the rails from the anvils 17 during the time in which it is desired to advance the rails, and for lowering the rails onto the anvils when it is desired to make the welded joints between successive rails. For this purpose I have provided a pair of generally curved or arcuately-shaped levers 18 and 19 illustrated in the drawings as being formed from a pair of similar spaced-apart members, although if desired, a single member can be used. The levers are pivoted at their upper ends in any suitable manner. The lifting mechanism associated with the fixed portion of the welding apparatus, that is, the lifting mechanism at the left-hand end of Fig. 1 is suitably supported from a laterally extending plate 60 suitably secured to the sub-assembly 44 as by pins 61. The lifting mechanism associated with the movable sub-assembly or platen 47 is suitably supported from the right-hand end of the assembly 47 as by means of pins 62, suitably secured to the side wall of the sub-assembly 47. As previously stated, the lower ends of the levers 18 and 19 are joined by a link 20 disposed between the arms of each of the levers and pivotally attached thereto. A member or element 21, shown in the drawings as a roller, is suitably supported from the lifting mechanism for engagement with the underside of the lower flange of the rails. In the form of my invention illustrated herein, the roller 21 is carried by a suitable axle 63 journaled at either end thereof in blocks 64 suitably retained between the spaced-apart arms of the levers. The roller 21 is provided with flanges 65 at the ends thereof to assist in guiding and centering the rails, the diagonal surfaces 67 further assisting in the guiding and centering function.

In order to operate the lifting mechanism, there is provided a fluid-operated device 22 associated with the link 20 by means of a plunger or rod 66 suitably pivotally secured at the free end thereof to the link 20. As best seen in Figs. 2 and 3, the roller when maintained out of the rail engaging position is disposed downwardly and to the right from the rail, but when the lifting mechanism is operated to elevate the rail from the anvil the levers will swing in a clockwise direction about their pivot points and move the roller upwardly and to the left into engagement with the rail. However, as will be apparent from a consideration of Figs. 2 and 3, the curvature of members 18 and 19 is such that the roller moves substantially vertically and the fluid pressure means acts substantially along a line extending through the pivot point 20a, roller 21, and rail 11. It will be apparent that when the rail is lifted out of engagement with the anvil it may readily be moved on the roller in either direction longitudinally of the apparatus.

I have provided means for moving the frame 10 with respect to any support with which it may be associated. For this purpose I have provided fluid-operated means attached at one end thereof to the frame 10, as by means of a bracket 67 and at the other end thereof to a supporting means, as by a bracket 68. A fluid furnished to a cylinder 69, as by means of the conduits 70 and 71, may be employed to operate a piston within the cylinder for causing the plunger 72 extending therefrom into association with the bracket 67 to cause the frame 10 to move in the direction of the rail, thereby permitting movement of the apparatus with respect to the joint where the weld is to take place.

While I have shown my invention in connection with particular embodiments of the rail welder, I do not desire my invention to be limited to the particular construction shown and described. For example, the above-described apparatus may be used to butt weld bars and pipes, etc. Therefore, I intend in the appended claims to cover all modifications within the spirit and scope of my invention.

What I claim as new and desire to secure by Letters Patent of the United States is:

1. Butt welding apparatus of the type in which a pair of members are butt welded to form a continuous article, means for supporting each of said members, and means for moving each of said members out of engagement therewith, said means comprising a pair of levers pivotally associated with said apparatus adjacent the upper end of said levers, a link joining the free ends of said levers, a roller journaled between said levers, said roller guiding said member during insertion and withdrawal of said members, and fluid pressure means acting on said link for selectively moving said roller into and out of engagement with said members.

2. Butt welding apparatus of the type in which a pair of members are butt welded to form a continuous article, means for supporting each of said members, and means for moving each of said members out of engagement therewith, said means comprising a pair of levers pivotally associated with said apparatus adjacent the upper ends of said levers, a link joining the free ends of said levers, a roller journaled between said levers, said roller guiding said member during insertion and withdrawal of said members with respect to said apparatus, and fluid pressure means acting on said link for selectively moving said roller into and out of engagement with said members and for moving said members, the last-mentioned means acting substantially along a line extending through the point at which the last-mentioned means acts on said link, said roller, and said members.

3. Butt welding apparatus of the type in which a pair of members are butt welded to form a continuous article, means for supporting each of said members, and means for moving each of said members out of engagement therewith, said means comprising a pair of similarly shaped, generally arcuate levers pivotally associated with said apparatus adjacent the upper ends of said levers, a link joining the free ends of said levers, a roller journaled between said levers, said roller guiding said member during insertion and withdrawal of said members with respect to said apparatus, and fluid pressure means acting on said link for selectively moving said roller into and out of engagement with and for moving said members.

VERNI J. CHAPMAN.